(12) United States Patent
Xiao et al.

(10) Patent No.: US 7,949,621 B2
(45) Date of Patent: May 24, 2011

(54) OBJECT DETECTION AND RECOGNITION WITH BAYESIAN BOOSTING

(75) Inventors: Rong Xiao, Beijing (CN); Xiaoou Tang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 801 days.

(21) Appl. No.: 11/871,899

(22) Filed: Oct. 12, 2007

(65) Prior Publication Data
US 2009/0099990 A1 Apr. 16, 2009

(51) Int. Cl.
*G06F 15/18* (2006.01)
(52) U.S. Cl. ........... 706/20; 706/45; 706/46; 706/47; 706/48; 706/62; 382/155; 382/156; 382/157; 382/158; 382/159; 382/160; 382/168; 382/169; 382/170; 382/181
(58) Field of Classification Search ............... None
See application file for complete search history.

(56) References Cited

U.S. PATENT DOCUMENTS

| | | | |
|---|---|---|---|
| 6,954,544 B2 | 10/2005 | Jepson et al. | |
| 7,020,337 B2* | 3/2006 | Viola et al. | 382/224 |
| 7,162,076 B2 | 1/2007 | Liu | |
| 7,194,114 B2* | 3/2007 | Schneiderman | 382/118 |
| 7,668,346 B2* | 2/2010 | Xiao et al. | 382/118 |
| 7,720,284 B2* | 5/2010 | Zhang et al. | 382/173 |
| 2004/0179719 A1 | 9/2004 | Chen et al. | |
| 2005/0036690 A1 | 2/2005 | Zhou et al. | |
| 2005/0264658 A1 | 12/2005 | Ray et al. | |
| 2006/0088207 A1 | 4/2006 | Schneiderman | |
| 2006/0233422 A1 | 10/2006 | Toyama | |
| 2007/0036414 A1 | 2/2007 | Georgescu et al. | |
| 2008/0107341 A1* | 5/2008 | Lu | 382/190 |
| 2008/0219558 A1* | 9/2008 | Lu et al. | 382/190 |

FOREIGN PATENT DOCUMENTS
WO WO2005073896 A1 8/2005

OTHER PUBLICATIONS

Huang, et al., "Jensen-Shannon Boosting Learning for Object Recognition", IEEE, 2005, pp. 1-6.
Javed, et al., "Online Detection and Classification of Moving Objects Using Progressively Improving Detectors", retrieved on Apr. 17, 2007, at <<http://ieeexplore.ieee.org/search/wrapper.jsp?arnumber=1467336>>, IEEE, 2006, pp. 1.
Levi, et al., "Learning Object Detection From a Small Number of Examples: The Importance of Good Features", IEEE, 2004, pp. 1-8.
Li, et al., "Boosting Local Feature Based Classifiers for Face Recognition", retrieved on Apr. 17, 2007, <<http://ieeexplore.ieee.org/xpl/freeabs_all.jsp?arnumber=1384880>>, IEEE, 2006, pp. 1.

(Continued)

*Primary Examiner* — Omar F Fernandez Rivas
(74) *Attorney, Agent, or Firm* — Lee & Hayes, PLLC

(57) ABSTRACT

An efficient, effective and at times superior object detection and/or recognition (ODR) function may be built from a set of Bayesian stumps. Bayesian stumps may be constructed for each feature and object class, and the ODR function may be constructed from the subset of Bayesian stumps that minimize Bayesian error for a particular object class. That is, Bayesian error may be utilized as a feature selection measure for the ODR function. Furthermore, Bayesian stumps may be efficiently implemented as lookup tables with entries corresponding to unequal intervals of feature histograms. Interval widths and entry values may be determined so as to minimize Bayesian error, yielding Bayesian stumps that are optimal in this respect.

20 Claims, 7 Drawing Sheets

OTHER PUBLICATIONS

Luo, "Optimization Design of Cascaded Classifiers", IEEE, 2005, pp. 1-6.
Nevatia, "Detection of Multiple, Partially Occluded Humans in a Single Image by Bayesian Combination of Edgelet Part Detectors", retrieved on Apr. 17, 2007, at <<http://ieeexplore.ieee.org/xpl/freeabs_all.jsp?arnumber=1541243>>, IEEE, 2006, pp. 1.
Osuna, et al., "Training Support Vector Machines: An Application to Face Detection", Proceeding of CVPR, 1997, pp. 1-8.
Rissanen, et al., "Density Estimation by Stochastic Complexity", IEEE, vol. 38, No. 2, 1992, pp. 315-323.
Rowley, et al., "Neural Networked-Based Face Detection", IEEE, vol. 20, No. 1, 1998, pp. 23-38.
Schneiderman, "Learning a Restricted Bayesian Networked for Object Detection", IEEE, 2004, pp. 1-8.
Sun, et al., "Automatic Cascade Training with Perturbation Bias", IEEE, 2004, pp. 1-8.
Viola, et al., "Rapid Object Detection Using a Boosted Cascade of Simple Features", Computer Vision and Pattern Recognition, 2001, pp. 1-9.
Xiao, et al., "Robust Multipose Face Detection in Images", IEEE, vol. 14, No. 1, 2004, pp. 31-41.
Birge et al., "How many bins should be put in a regular histogram", pre-publication copy, presented at the University of Paris on Apr. 2002, 22 pages, published in ESAIM: P&S, Feb. 2006, vol. 10, pp. 24-45.
Bourdev et al., "Robust Object Detection Via Soft Cascade", Proceedings of the 2005 IEEE Computer Society Conference on Computer Vision and Pattern Recognition (CVPR'05), San Diego, California, Jun. 20-26, 2005, vol. 2, pp. 236-253.
Brubacker et al., "Towards Optimal Training of Cascade Detectors", 9th European Conference on Computer Vision (ECCV'06), Graz, Austria, May 7-13, 2006, 13 pages.
Huang et al., "Boosting Nested Cascade Detector for Multi-View Face Detection", 17th International Conference on Pattern Recognition (ICPR'04), Cambridge, United Kingdom, Aug. 23-26, 2004, vol. 2, pp. 415-418.
Huang et al., "Jensen-Shannon Boosting Learning for Object Recognition", IEEE Computer Society Conference on Computer Vision and Pattern Recognition (CVPR'05), San Diego, California, Jun. 20-26, 2005, vol. 2, pp. 144-149.
Javed et al., "Online Detection and Classification of Moving Objects Using Progressively Improving Detectors", IEEE Computer Society Conference on Computer Vision and Pattern Recognition (CVPR'05), San Diego, California, Jun. 20-25, 2005, vol. 1, pp. 696-701.
Leinhart et al., "An Extended Set of Haar-like Features for Rapid Object Detection", IEEE International Conference on Image Processing (ICIP'02), Rochester, NY, Sep. 22-25, 2002, vol. 1, pp. 900-903.
Levi et al., "Learning Object Detection From a Small Number of Examples: The Importance of Good Features", IEEE Computer Science Conference on Computer Vision and Pattern Recognition (CVPR'04), Washington, DC, Jun. 27-Jul. 2, 2004, vol. 2, pp. 43-60.
Luo, "Optimization Design of Cascaded Classifiers", IEEE Computer Society Conference on Computer Vision and Pattern Recognition (CVPR'05), San Diego, California, Jun. 20-26, 2005, vol. 1, pp. 480-485.
Osuna et al., "Training Support Vector Machines: An Application to Face Detection", Conference on Computer Vision and Pattern Recognition (CVPR'97), San Juan, Puerto Rico, Jun. 17-19, 1997, 8 pages.
Rissanen et al., "Density Estimation by Stochastic Complexity", IEEE Transactions on Information Theory, vol. 38, No. 2, Mar. 1992, pp. 315-323.
Rowley et al., "Neural Networked-Based Face Detection", IEEE Transactions on Pattern Analysis and Machine Intelligence, vol. 20, No. 1, Jan. 1998, pp. 23-38.
Schapire et al., "Improved Boosting Algorithms Using Confidence-rated Predictions", Machine Learning, vol. 37, No. 3, 1999, pp. 297-336.
Schneiderman, "Learning a Restricted Bayesian Network for Object Detection", IEEE Computer Society Conference on Computer Vision and Pattern Recognition (CVPR'04), vol. 2, Washington, DC, Jun. 27-Jul. 2, 2004, 8 pages.
Sun et al., "Automatic Cascade Training with Perturbation Bias", IEEE Computer Society Conference on Computer Vision and Pattern Recognition (CVPR'04), vol. 2, Washington, DC, Jun. 27-Jul. 2, 2004, 8 pages.
Viola et al., "Rapid Object Detection Using a Boosted Cascade of Simple Features", IEEE Computer Society Conference on Computer Vision and Pattern Recognition (CVPR'01), vol. 1, Kauai, Hawaii, Dec. 8-14, 2001, 9 pages.
Viola, et al., "Robust Real-time Object Detection", Second International Workshop on Statistical and Computational Theories of Vision—Modeling, Learning, Computing, and Sampling, Vancouver, Canada, Jul. 13, 2001, 25 pages.
Wu et al., Abstract: "Detection of Multiple, Partially Occluded Humans in a Single Image by Bayesian Combination of Edgelet Part Detectors", Tenth IEEE International Conference on Computer Vision, vol. 1, Oct. 2005, 1 page, retrieved on Apr. 17, 2007, at <<http://ieeexplore.ieee.org/xpl/freeabs_all.jsp?arnumber=1541243>>.
Xiao et al., "Boosting Chain Learning for Object Detection", Ninth IEEE International Conference on Computer Vision (ICCV'03), vol. 1, Nice, France, Oct. 13-16, 2003, 7 pages.
Xiao et al., "Robust Multipose Face Detection in Images", IEEE Transactiona on Circuits and Systems for Video Technology, vol. 14, No. 1, Jan. 2004, pp. 31-41.
Zhang et al., "Boosting Local Feature Based Classifiers for Face Recognition", Conference on Computer Vision and Pattern Recognition (CVPR'04), Washington, DC, Jun. 27-Jul. 2, 2004, vol. 5, pp. 87.

* cited by examiner

OBJECT DETECTION AND RECOGNITION WITH BAYESIAN BOOSTING

BACKGROUND

Automated object detection and/or recognition (ODR) is a core facility enabling sophisticated treatment of raw data. Applications are varied, but illustrative examples include detection of physical objects (from simple geometric shapes through to geographic features, vehicles and faces) in raw static images or video, as well as detection of audio objects such as songs or voices in raw audio data. In some cases, detection (i.e., detection and/or recognition) is practically the whole application, in others, it is a small part of a much larger application.

A myriad of techniques have been developed for ODR, each with its advantages and disadvantages. However, a constant theme over time has been a demand for better efficiency as raw data sets grow ever larger. For example, it is desirable to recognize aspects of non-text media available in large public computer networks to facilitate non-text media search functionality, but it is not uncommon for corresponding raw data sets to contain items numbering in the billions. At such scales even small improvements in detection speed and accuracy can have large efficiency impacts, and it is desirable to know when a particular technique has been optimally configured in some respect.

SUMMARY

An efficient, effective and at times superior object detection and/or recognition (ODR) function may be built from a set of Bayesian stumps. Bayesian stumps may be constructed for each feature and object class, and the ODR function may be constructed from the subset of Bayesian stumps that minimize Bayesian error for a particular object class. That is, Bayesian error may be utilized as a feature selection measure for the ODR function. Furthermore, Bayesian stumps may be efficiently implemented as lookup tables with entries corresponding to unequal intervals of feature histograms. Interval widths and entry values may be determined so as to minimize Bayesian error, yielding Bayesian stumps that are optimal in this respect.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The same numbers are used throughout the disclosure and figures to reference like components and features.

DETAILED DESCRIPTION

In an embodiment of the invention, an efficient object detection and/or recognition (ODR) function is built from a set of Bayesian stumps. A Bayesian stump may be implemented with a lookup table (LUT) having entries corresponding to intervals of a feature histogram. Each Bayesian stump may have a specified (and possibly same) number of entries. The entries may correspond to feature intervals having unequal width. The width of the intervals may be automatically determined. The width of the intervals and the value of corresponding lookup table entries may be set so as to minimize Bayesian error. That is, the Bayesian stump may be constructed so as to be optimal with respect to Bayesian error for a given feature and lookup table.

Such Bayesian stumps may be constructed for each feature and object class. Each such Bayesian stump may be considered, by itself, a weak classifier. An adaptive boosting ("Adaboost") technique may be utilized to construct a strong classifier, that is, an effective ODR function, based on Bayesian stumps. Such boosting techniques require a way of selecting between weak classifiers and, in an embodiment of the invention, those Bayesian stumps are selected which minimize Bayesian error. That is, Bayesian error may serve as a feature selection measure for the strong classifier, and is at times superior to conventional measures such as Bhattacharyya distance or Jensen-Shannon entropy in terms of both speed and accuracy. As used herein, the term "Bayesian boosting" includes construction of Bayesian stumps as well as construction of ODR functions based on Bayesian stumps in accordance with an embodiment of the invention.

Figure 1:
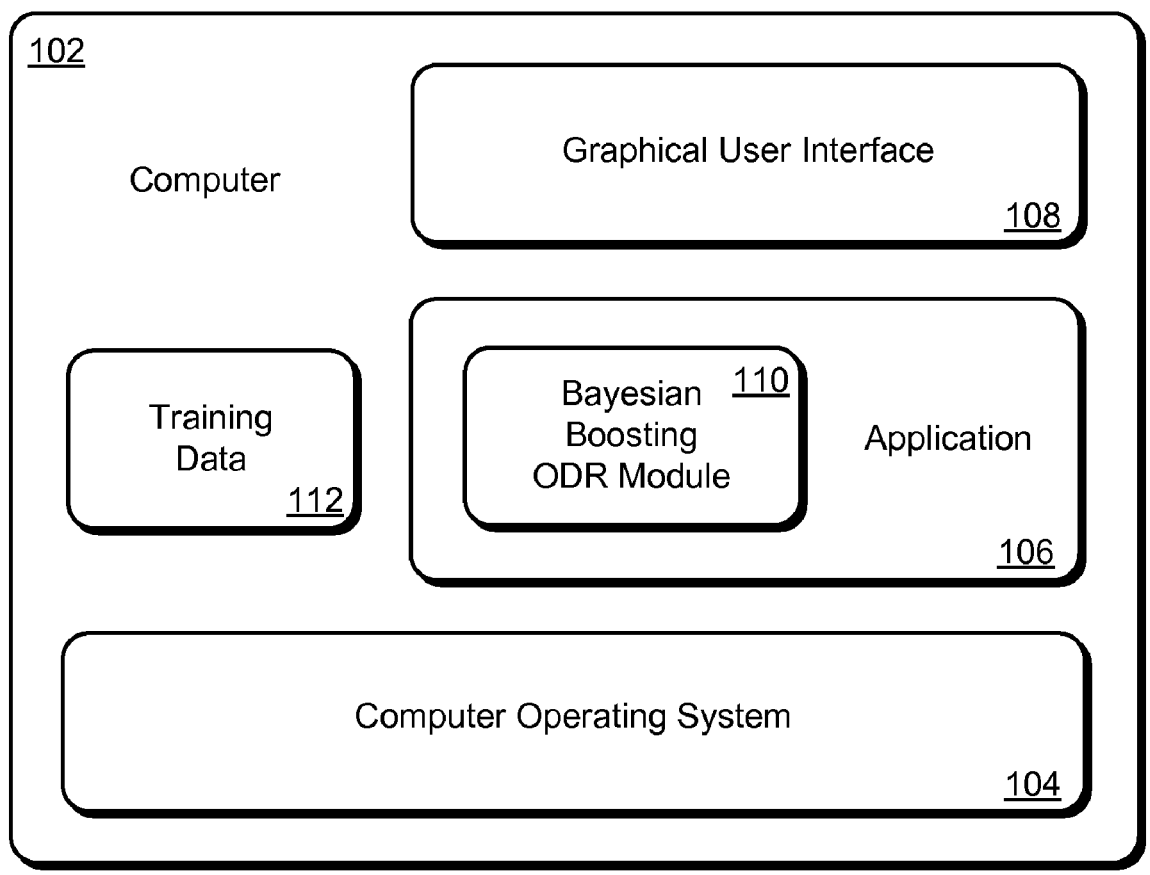
FIG. 1 is a schematic diagram depicting an example computing environment in accordance with an embodiment of the invention.

Before describing further details of object detection in accordance with an embodiment to the invention, it will be helpful to have reference to an example computing environment suitable for incorporating such. FIG. 1 depicts an example of a suitable computing environment 100. The computing environment 100 depicts a computer 102 including a computer operating system 104, a computing application 106, and a graphical user interface (GUI) 108. In this example, the application 106 includes a Bayesian boosting ODR module 110, and the computer maintains a set of training data 112 for the Bayesian boosting ODR module 110.

The computer 102 may be any suitable computing device. Examples of suitable computing devices include mainframes, minicomputers, desktop computers, personal computers (PCs), workstations, portable computers, laptop computers, tablet computers, personal digital assistants (PDAs), mobile telephones, programmable consumer electronics devices, routers, gateways, switches, hubs, and suitable combinations thereof.

The computer 102 may include one or more processing units capable of executing instructions to perform tasks, as well as one or more types of computer-readable media such as volatile and/or non-volatile memory capable of storing data, computer programs and/or computer program components. Such computer programs and components may include executable instructions, structured data and/or unstructured data organized into modules, routines and/or any suitable programmatic object. Such computer programs and components may be created by and/or incorporate any suitable computer programming language.

The computer 102 may include a wide variety of input/output (IPO) devices not shown in FIG. 1 such as keyboards, keypads, touchpads, mice, trackballs, pens, joysticks, gamepads, scanners, cameras, microphones, monitors, liquid crystal displays (LCDs), light emitting diodes (LEDs), printers and/or speakers. Examples of computer-readable media suitable for reading by the computer 102 include any one or more of magnetic media (such as hard disks), optical media such as compact disks (CDs) and communication media. Communication media may include any one or more of wired communication media such as copper wire, coaxial cable and optical fiber, as well as wireless communication media such as electromagnetic media including radio, microwave, infra-red and laser light. In an embodiment of the invention, each computer-readable medium is tangible.

For clarity, embodiments of the invention may be described herein with reference to symbolic operations such as those of a computer programming language. Such symbolic operations and any data that they act upon correspond to physical states of components and changes in components of computing devices such as the computer 102 in a manner well understood by one of skill in the art. In an embodiment of the invention, each such operation and its associated data may be fully implemented in hardware.

The application 106 may be any suitable application making use of ODR functionality. Although FIG. 1 shows the computer 102 including only one application 106, each embodiment of the invention is not so limited, and the computer 102 may include any suitable number of application such as the application 106. The application 106 may utilize the computer operating system 104 to access functionality of the computer 102 and/or access computer 102 functionality directly. A user of the computer 102 may interact with the application 106 through the graphical user interface 108 and/or any suitable user interface.

As will be apparent to one of skill in the art, the Bayesian boosting ODR module 110 need not be entirely incorporated into an application such as the application 106. For example, Bayesian boosting ODR module 110 functionality may be made available to the application 106 utilizing any suitable distributed functionality technique. Similarly, the training data 112 need not be located entirely at the computer 102, but may be suitably distributed, for example, in a network of computers such as the computer 102.

The training data 112 may include a set S of classified examples $\{(x_i, y_i)\}$, $i=1, \ldots, N$, where $x_i$ is a unit (e.g., a file or record) of raw data containing a positive or negative example (e.g., presence or absence) of a particular object and/or class of objects, $y_i$ is an object classification label corresponding to a classification of the example $x_i$, and N is any suitable number of examples. The object classification labels $y_i$ are taken from a set of object classification labels $\{w_c\}$, $c=1, \ldots, C$, where again, C may be any suitable number. As an illustrative example that will be elaborated below, the raw data $x_i$ may be static images, some of which include human faces, the set of object classification labels may be $\{w_1, w_2\}$ where $w_1$ corresponds to a classification of "contains a face," and $w_2$ corresponds to a classification of "does not contain a face," and the set S is a set of appropriately labeled static images.

Figure 2:
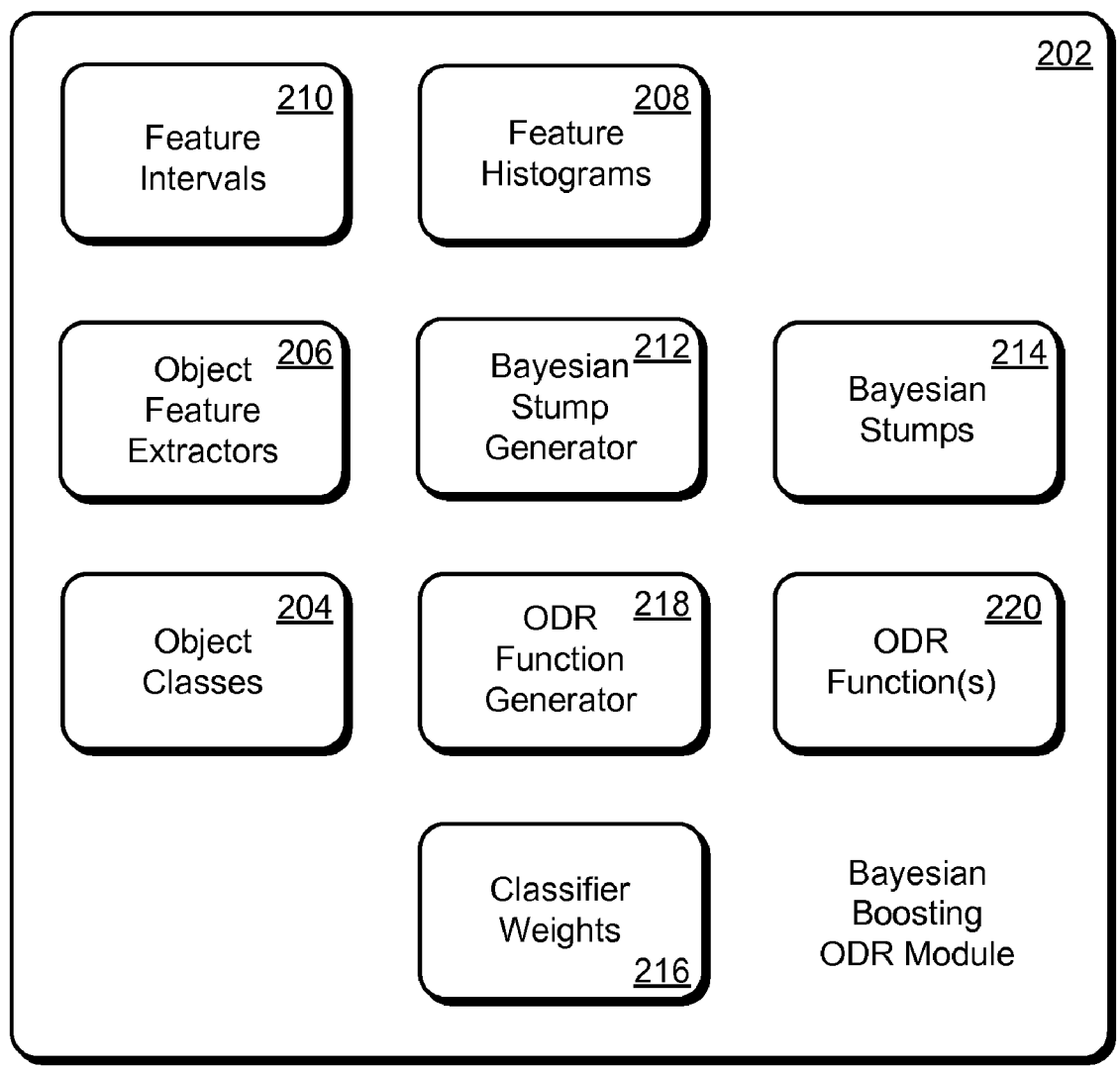
FIG. 2 is a schematic diagram depicting an example Bayesian boosting object detection and/or recognition (ODR) module in accordance with an embodiment of the invention.

The training data 112 may be utilized by the Bayesian boosting ODR module 110 to build Bayesian stumps and an ODR function capable of detecting object classes $\{w_c\}$. FIG. 2 depicts an example Bayesian boosting ODR module 202 in accordance with an embodiment of the invention. The Bayesian boosting ODR module 202 may include a set of object classes 204 corresponding to the set of object classification labels $\{w_c\}$. The object classes 204 may determine the classes of object which the Bayesian boosting ODR module 202 is capable of discriminating between.

The Bayesian boosting ODR module 202 may further include a set of object feature extractors 206. The set of object feature extractors 206 may be a set of functions $\{\phi_j\}$, $j=1, \ldots, M$, where M is any suitable number, capable of extracting some feature of the raw data, for example, capable of evaluating a feature score for a particular item of raw data. Such feature extractors $\phi_j$ may be linear (e.g., wavelet transforms) or non-linear (e.g., local binary pattern filters). By using the object feature extractors 206 on the training data 112 (FIG. 1), feature space histograms 208 (i.e., Bayesian histograms) may be constructed for each of the object classes 204. The feature space histograms 208 may be quantized according to a set of feature space intervals 210 which need not have equal width.

A Bayesian stump generator 212 may construct the feature space histograms 208 from the training data 112 (FIG. 1), determine appropriate feature space interval 210 widths, and generate one or more Bayesian stumps 214. For example, the Bayesian stumps 214 may include weak classifiers implemented as lookup tables (LUTs) having entries corresponding to feature space intervals 210. Such lookup tables may have a fixed and/or specified number of entries K, and the feature space intervals 210 to which the entries correspond need not have equal width. That is, the Bayesian stumps 214 may include K-bin LUT-type weak classifiers with unequal bin width.

From the Bayesian stumps 214 and an adaptive set of classifier weights 216, an ODR function generator 218 may generate one or more ODR functions 220 capable of detecting objects belonging to one or more of the object classes 204 in raw data. For example, a particular one of the ODR functions 220 may be able to detect faces in static images.

Figure 3:
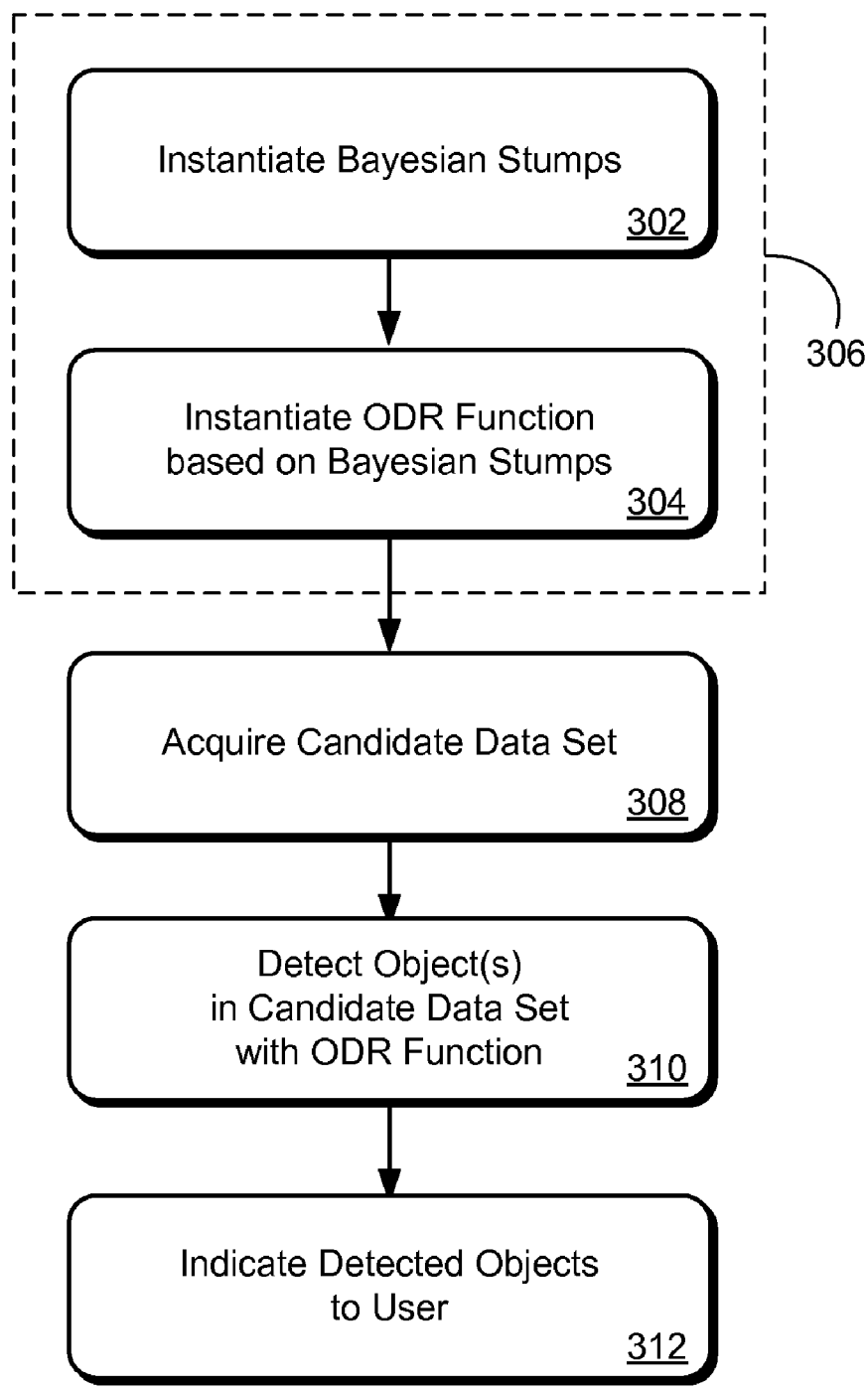
FIG. 3 is a flowchart depicting example high level steps for detecting objects in accordance with an embodiment of the invention.

Having described structural aspects of the Bayesian boosting ODR module 110 (FIG. 1), the description now proceeds to procedures and steps thereof that may be performed to take advantage of Bayesian boosting ODR module 110 functionality. FIG. 3 depicts example high level steps for object detection in accordance with an embodiment of the invention.

At step 302, one or more Bayesian stumps may be instantiated. For example, the Bayesian stump generator 212 (FIG. 2) may instantiate one or more Bayesian stumps 214 based on the feature space histograms 208. Example steps for performing step 302 are described below in more detail with reference to FIGS. 4 and 5. At step 304, an ODR function may be instantiated based on the Bayesian stumps instantiated at step 302. For example, the ODR function generator 218 may instantiate the ODR function 220 based on the Bayesian stumps 214. Example steps for performing step 304 are described in more detail below with reference to FIGS. 6 and 7. Steps 302 and 304 are grouped with dashed line 306 to indicate that these steps 302 and 304 are preparatory to object detection, and involve training or "learning" with the training data 112 (FIG. 1).

At step 308, a candidate data set may be acquired. For example, the computer 102 (FIG. 1) may acquire the candidate data set with an acquisition device or from a network of computers to which the computer 102 is connected. At step 310, the ODR function instantiated at step 304 may be utilized to detect one or more objects in the candidate data set acquired at step 308. Such detection may be considered to be dependent on the ODR function and/or one or more of the Bayesian stumps instantiated at step 302. For example, the application 106 may apply the ODR function 220 (FIG. 2) to the candidate data set, or request that the Bayesian boosting ODR module 110 apply the ODR function 220 to the candidate data set. At step 312, an indication of objects detected at step 310 may be presented to a user of the computer 102. For example, the application 106 may utilize the graphical user interface 108 to present such indication. In an embodiment of the invention. such indication includes modification of one or more computer-readable media.

Figure 4:
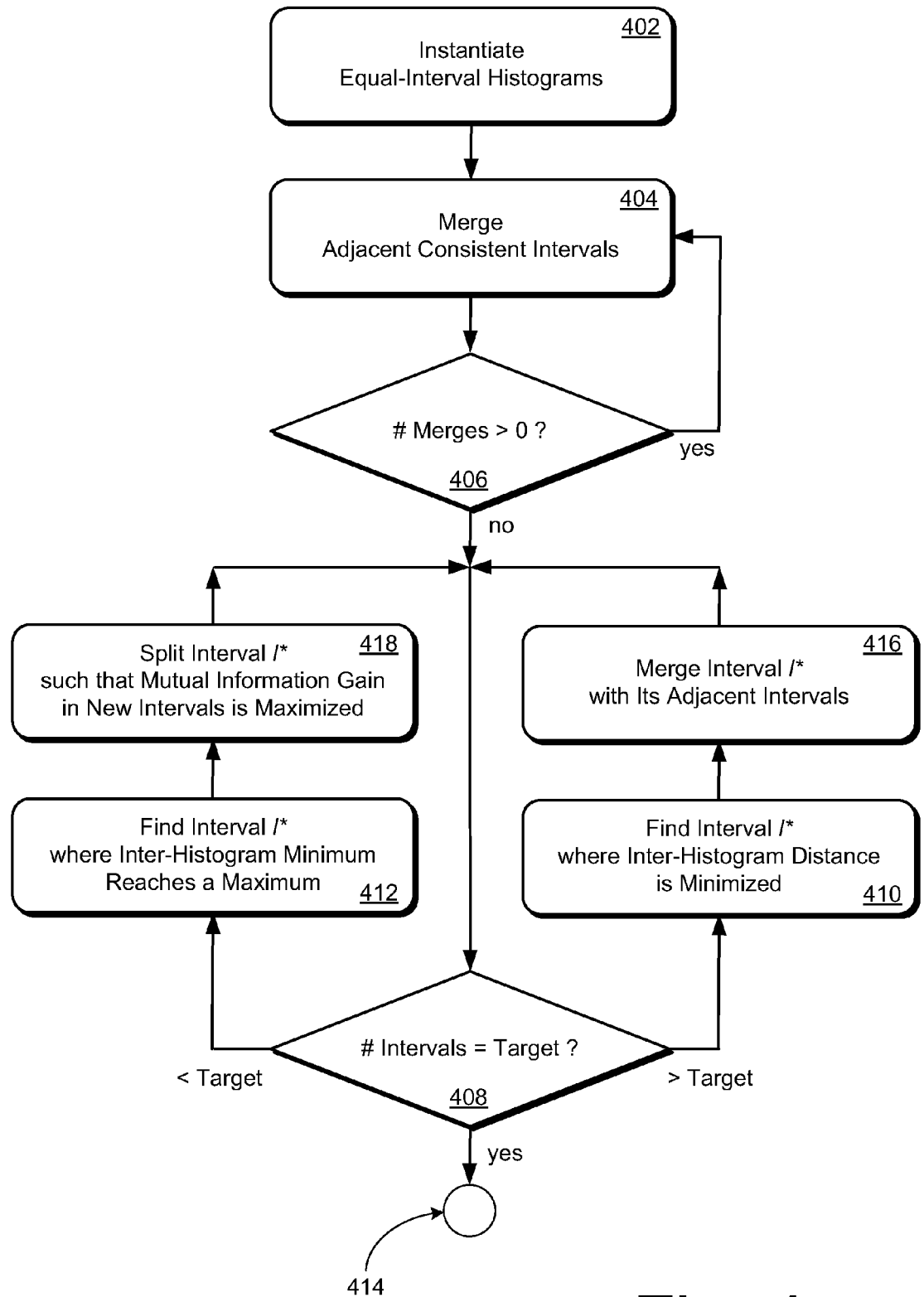
FIG. 4 is a flowchart depicting example steps for instantiating Bayesian stumps in accordance with an embodiment of the invention.
Figure 5:
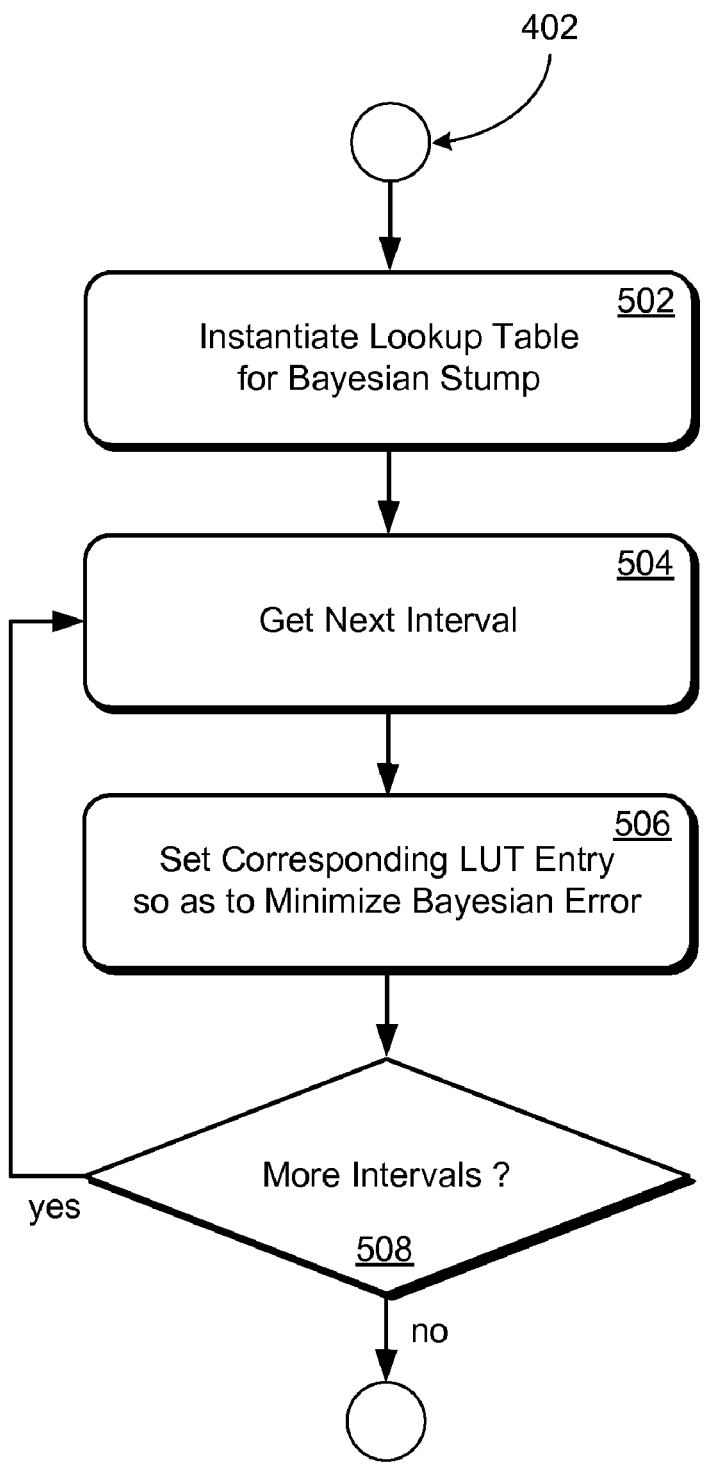
FIG. 5 is a flowchart depicting further example steps for instantiating Bayesian stumps in accordance with an embodiment of the invention.

The Bayesian stump generator 212 (FIG. 2) may generate Bayesian stumps 214 from the feature space histograms 208. As part of Bayesian stump 214 generation, the Bayesian stump generator 212 may determine feature space intervals 210 and corresponding lookup table entry values that minimize Bayesian error with respect to feature space histograms 208 for complementary object classes 204. FIGS. 4 and 5 depict example steps for instantiating Bayesian stumps in accordance with an embodiment of the invention.

At step 402, equal-interval feature space histograms may be instantiated. For example, the Bayesian stump generator 212 (FIG. 2) may generate a feature space histogram $p(\phi_j(x), w_c)$ for each feature extractor $\phi_j$ and object class $w_c$ by applying the feature extractor $\phi_j$ to those items of the training data 112 (FIG. 1) labeled with object class $w_c$. The feature space may be quantized into a number L of bins or intervals $\sigma_l$ (e.g., 1000). The feature space intervals 210 may have a set of intervals $\sigma_l$ for each histogram 208 corresponding to the quantization, and following step 402 the set of intervals a may contain intervals of equal width.

If the information density of the feature space is non-uniform (as is not infrequently the case) then quantizing the feature space with intervals of equal width is inefficient. A high number of intervals may be required to adequately capture details in regions of high information density and then the overhead to support the additional intervals in regions of low information density will be wasted. Instead intervals of unequal width may be utilized, but then a method of determining suitable interval widths is required. In the example depicted in FIG. 4, the feature space is first quantized into a large number L of equal sized intervals at step 402, and then the intervals are merged and split if the intervals satisfy particular criteria in order to achieve a target number K of intervals not necessarily of equal size.

Adjacent intervals may be examined for consistency. In an embodiment of the invention, adjacent intervals are considered consistent if an arithmetic difference between two feature histograms 208 (FIG. 2) has the same sign in each interval. For example, the two histograms 208 may be two histograms for a same feature but complimentary object classes (such as $w_1$ and $w_2$). Symbolically, a region $\sigma$ of adjacent intervals is consistent if:

$$(f(x_r)-g(x_r))*(f(x_s)-g(x_s)) \geq 0$$

for any $x_r$, $x_s$ in the region $\sigma$, where, for example, $f(x) = p(\phi_j(x), w_1)$ and $g(x) = p(\phi_j(x), w_2)$. At step 404, adjacent consistent intervals in a set of feature intervals 210 (FIG. 2) may be merged. Although merging decreases the number of intervals in the set, the width of merged intervals increases so that the sum of interval widths remains constant. After performing step 404 it may be that further such merging is possible, or else it may be that there were no adjacent consistent intervals in the set to be merged. At step 406, it may be determined if any merges occurred at step 404. If some (i.e., more than zero) merges did occur, a procedure incorporating steps depicted in FIG. 4 may return to step 404 to attempt to perform further such merges. Otherwise, no further merges are possible at step 404 and the procedure may progress to step 408.

Following one or more iterations of step 404, the number of intervals in the set may be decreased, for example, from the initial number of intervals L to a current number of intervals L'. At step 408, the current number of intervals L' may be compared to the target number of intervals K. If the current number of intervals L' is still greater than the target number of intervals K, the procedure may progress to step 410. If the current number of intervals L' is now less than the target number of intervals K, the procedure may progress to step 412. If the current number of intervals L' is now equal to the target number of intervals K, the procedure may progress to step 502 of FIG. 5. The circle labeled 414 on FIGS. 4 and 5 is a diagrammatic device that connects the steps depicted in FIG. 4 and the steps depicted in FIG. 5.

At step 410, the set of L' feature intervals 210 (FIG. 2) may be examined to find an interval l* at which an inter-histogram distance is minimized. For example, a distance between histograms $p(\phi_j(x), w_1)$ and $p(\phi_j(x), w_2)$. may be calculated for each interval in the set of L' feature intervals 210, and the interval l* may be an interval for which a minimum such distance is calculated. Symbolically:

$$l^* = \arg\min_l |p(l, w_1) - p(l, w_2)|$$

where l is any of the set of L' feature intervals 210 (FIG. 2). At step 416, the interval l* found in step 410 may be merged with the intervals to which it is adjacent. Typically, interval l* will be merged with adjacent intervals l*−1 and l*+1, however, interval l* may only be merged with one other interval if it is an end interval at one extreme of the feature space. The procedure may then progress again to step 408 to test if the target number of intervals K has been achieved.

In contrast, at step 412, the set of L' feature intervals 210 (FIG. 2) may be examined to find an interval l* at which an inter-histogram minimum reaches a maximum. For example, the minimum of two histograms $p(\phi_j(x), w_1)$ and $p(\phi_j(x), w_2)$. may be calculated for each interval in the set of L' feature intervals 210 (i.e., the minimum of each interval may be calculated), and the interval l* may be an interval for which the calculated minimum reaches a maximum. Symbolically:

$$l^* = \arg\max_l [\min(p(l, w_1), p(l, w_2))]$$

where, again, l is any of the set of L' feature intervals 210 (FIG. 2). At step 418, the interval l* found in step 412 may be split to form two new intervals such that mutual information gain in the new intervals is maximized. Suppose the interval l* is the result of merging T subintervals, then the internal threshold k* at which to split the interval l* so as to maximize mutual information gain in the new intervals may be found by finding where I(k) reaches a maximum, where:

$$I(k) = u_k^1 * \log\left(\frac{u_k^1}{u_k^1 + v_k^1}\right) + v_k^1 * \log\left(\frac{v_k^1}{v_k^1 + u_k^1}\right) +$$
$$u_k^2 * \log\left(\frac{u_k^2}{u_k^2 + v_k^2}\right) + v_k^2 * \log\left(\frac{v_k^2}{v_k^2 + u_k^2}\right)$$

and $$u_k^1 = \sum_{i<k} p(l+i, w_1)$$

$$u_k^2 = \sum_{i\geq k} p(l+i, w_1)$$

-continued $$v_k^1 = \sum_{i<k} p(l+i, w_2)$$

$$v_k^2 = \sum_{i>k} p(l+i, w_2)$$

and k=1, ..., T. Symbolically:

$$k^* = \arg\max_k I(k)$$

Once the desired number of intervals K is achieved, at step 502, a lookup table having K entries may be instantiated for the corresponding Bayesian stump. For example, the Bayesian stump generator 212 (FIG. 2) may instantiate a lookup table to implement one of the Bayesian stumps 214. The lookup table entries may then be set with steps 504, 506 and 508.

At step 504, a next interval k of the K intervals may be selected (or else the first of the K intervals if none has previously $$h(k) = \frac{1}{2}\log\left(\frac{p(k, w_1)}{p(k, w_2)}\right)$$

been selected). At step 506, the corresponding entry of the lookup table instantiated at step 502 may be set so as to minimize Bayesian error. For example, the entry of the lookup table may be set to $w_1$ if that choice minimizes Bayesian error (i.e., $P(w_1|x)$), or otherwise $w_2$ (if $P(w_2|x)<P(w_1|x)$). The lookup table entry may be set to the object class label (e.g., the value of $w_1$ or $w_2$). Alternatively, the lookup table entry may be set to the corresponding log-likelihood of the classification.

At step 508, it may be determined if there are more intervals of the K intervals to be selected. If there are more intervals, the procedure may return to step 504 to select the next interval k. Otherwise, the procedure may progress to steps other than those depicted in FIGS. 4 and 5. Having instantiated the lookup table and set each entry, a Bayesian stump h(k) has been created for the feature $\phi_j$ having K entries corresponding to unequal intervals of the feature space.

Figure 6:
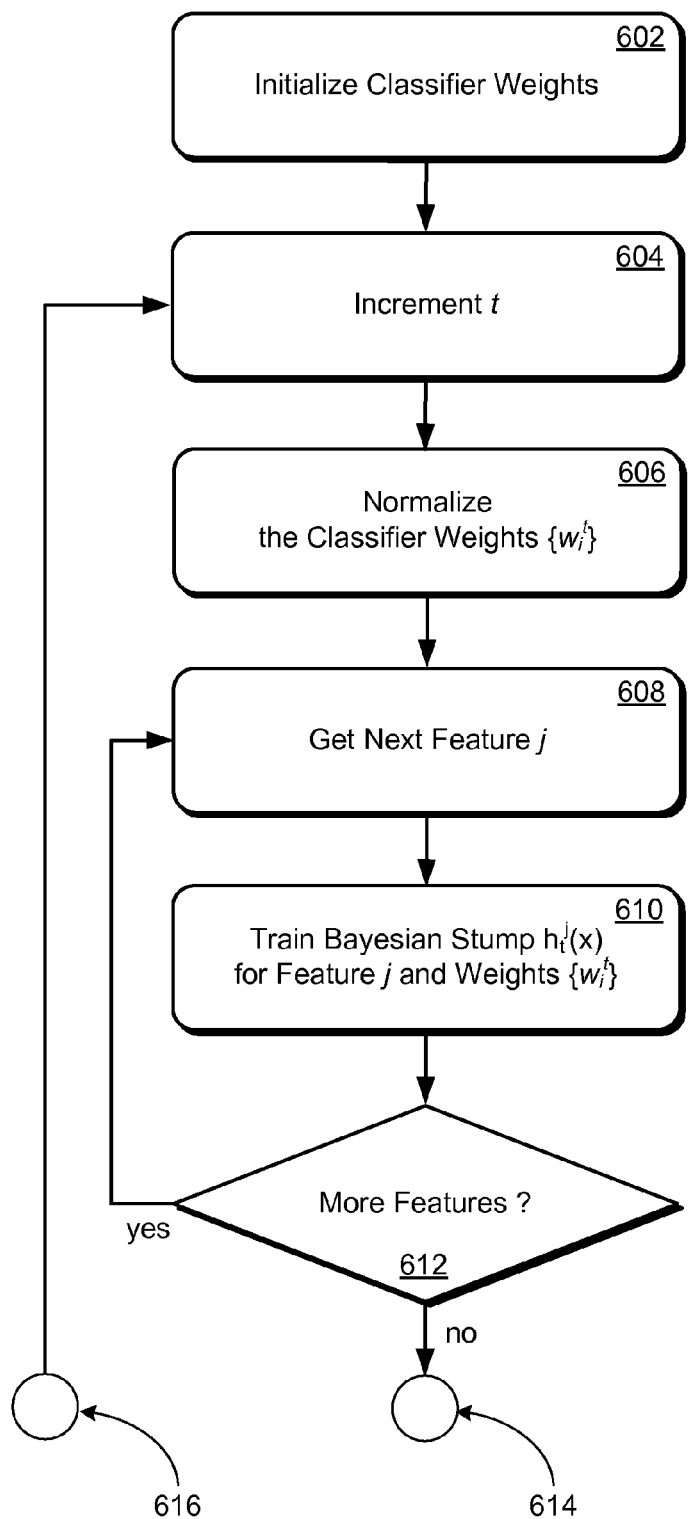
FIG. 6 is a flowchart depicting example steps for instantiating object detection and/or recognition (ODR) functions in accordance with an embodiment of the invention.
Figure 7:
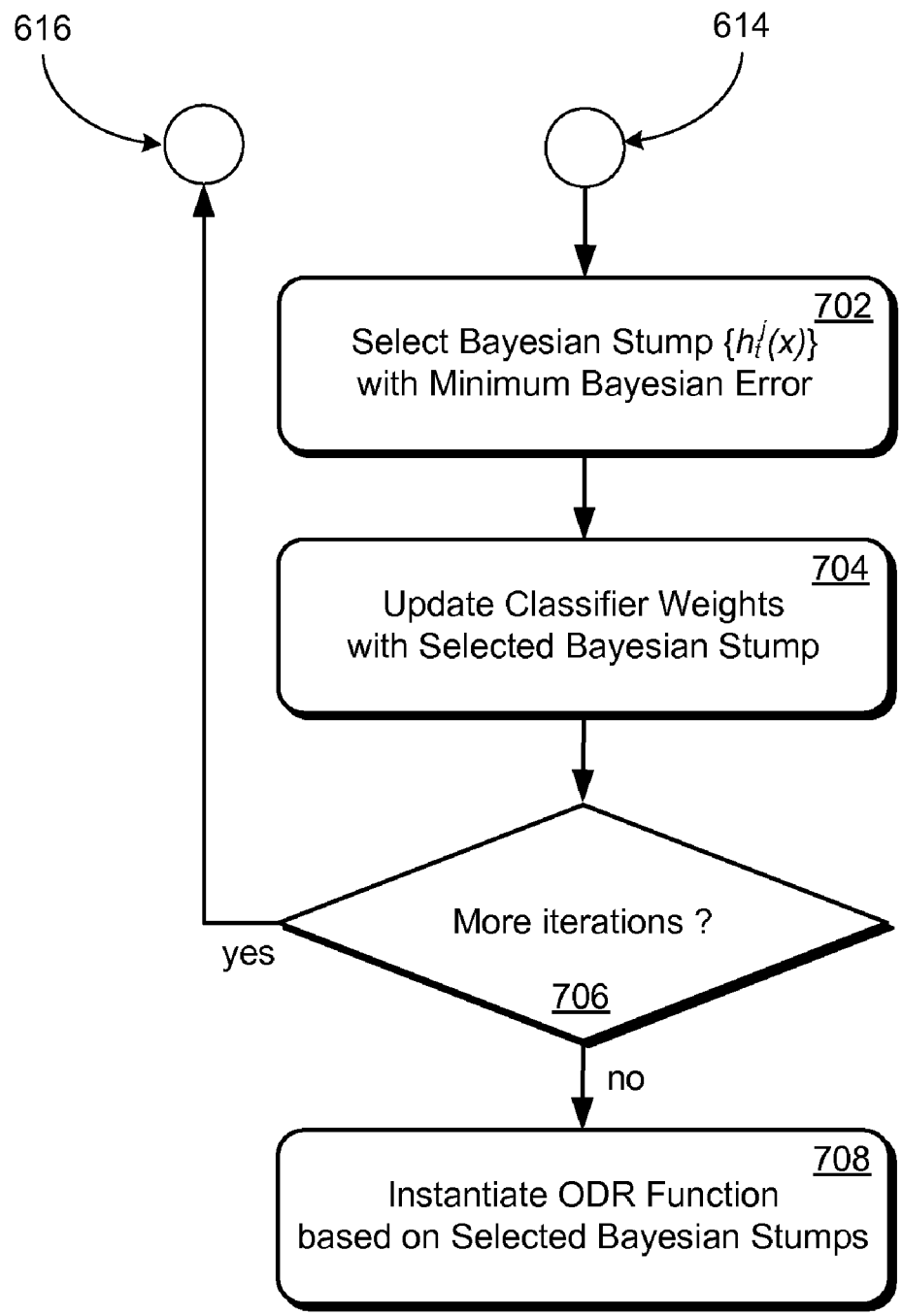
FIG. 7 is a flowchart depicting further example steps for instantiating object detection and/or recognition (ODR) functions in accordance with an embodiment of the invention.

An effective ODR function may be constructed from such Bayesian stumps. For example, the ODR function may be constructed from T such Bayesian stumps. FIGS. 6 and 7 depict example steps for instantiating an ODR function in accordance with an embodiment of the invention. At step 602, a set of classifier weights 216 (FIG. 2) may be initialized. For example, a set of classifier weights $\{w_i^t\}$ may have N×T weights that influence the effect of the N examples in the training data 112 (FIG. 1), and the weights may be initialized as follows: if $y_i=w_1$ then $w_i^1=p(w_1)/|w_1|$, or if $y_i=w_2$ then $w_i^1=p(w_2)/|w_2|$, for each i=1, ..., N. At step 604, t (which will run from 1 to T) may be incremented or initialized to 1. At step 606, the subset of classifier weights $\{w_i^t\}$ for the current value of t may be normalized. For example, the subset of classifier weights $\{w_i^t\}$ may be normalized in accordance with a probability distribution.

At step 608, a next feature j (i.e., a next feature extractor $\phi_j$) may be selected (or else a first such feature if none has been previously selected). At step 610, a Bayesian stump $w_i^t$ may be trained for the feature j and the classifier weights $\{w_i^t\}$. For example, the Bayesian stump generator 212 may instantiate a new one of the Bayesian stumps 214 for the feature j, and where the importance of each example in the feature space $x'_i = \phi_j(x_i)$ may be modified based on the classifier weight $w_i^t$ (e.g., $x'_i = w_i^t \phi_j(x_i)$). At step 612, it may be determined if there are more features to be selected. If there are more features to be selected, a procedure incorporating steps depicted in FIGS. 6 and 7 may return to step 608. Otherwise, the procedure may progress to step 702 of FIG. 7. The circles labeled 614 and 616 are diagrammatic connectors connecting FIG. 6 and FIG. 7 as indicated.

Steps 608, 610 and 612 may result in the instantiation of M Bayesian stumps, that is, one for each object feature extractor 206 (FIG. 2). However, it is desirable to select a best Bayesian stump $h_t(x)$ for each boosting iteration (i.e., for each t) to incorporate into the ODR function 220. In an embodiment of the invention, the best Bayesian stump for each boosting iteration is the Bayesian stump with minimum Bayesian error, where the Bayesian error for the Bayesian stump may be calculated as a sum of the Bayesian error for each of the K lookup table entries (and thus for the corresponding feature space intervals). At step 702, a Bayesian stump $h_t(x)$ of the set of Bayesian stumps $\{h_t^j(x)\}$ instantiated at step 610 with a minimum Bayesian error may be selected for incorporation into the ODR function 220. That is, Bayesian error may be utilized as a feature selection measure for the ODR function 220.

At step 704, classifier weights for the next boosting iteration (i.e., iteration t+1) may be updated based on the Bayesian stump selected at step 702. For example, classifier weights $w_i^{t+1}$ may be updated according to the formula: $w_i^{t+1} = w_i^t \exp(-h_t(x_i))$ for each i=1, ..., N. At step 706, it may be determined if there are more boosting iterations to complete (i.e., if t<T). If there are more boosting iterations to complete, the procedure may return to step 604. Otherwise, the procedure may progress to step 708.

At step 708, an ODR function 220 (FIG. 2) may be instantiated based on the selected Bayesian stumps $\{h_t(x)\}$ for t=1, ..., T. For example, the ODR function 220 may be instantiated as a strong classifier returning the sign of a sum of the selected Bayesian stumps $\{h_t(x)\}$. Symbolically:

$$H(x) = \text{sign}\left(\sum_{t=1}^{T} h_t(x)\right)$$

where H(x) is an ODR function 220 (FIG. 2) that may be used for binary (i.e., yes or no) detection of objects in raw data, and sign(x) is the conventional sign function.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to an embodiment of the invention.

Preferred embodiments of the invention are described herein, including the best mode known to the inventors for carrying out the invention. Variations of those preferred embodiments may become apparent to those of ordinary skill in the art upon reading the specification. The inventors expect skilled artisans to employ such variations as appropriate, and the inventors intend for the invention to be practiced otherwise than as explicitly described herein. Accordingly, embodiments of the invention include all modifications and equivalents of the subject matter recited in the following claims as permitted by applicable law.

The invention claimed is:

1. A method for object detection, the method comprising:
   in a processor, implementing the acts of:
   instantiating a lookup table for a weak classifier;
   setting an entry of the lookup table based on at least a Bayesian error associated with the entry, the entries of the lookup table corresponding to histogram intervals of a feature histogram;
   setting a width of the histogram intervals of the feature histogram and a value of a corresponding entry in the lookup table to minimize the associated Bayesian error; and
   modifying a computer-readable medium based on at least the weak classifier.

2. The method of claim 1, wherein the entry of the lookup table is set automatically minimize the associated Bayesian error.

3. The method of claim 1, wherein:
   the entry of the lookup table is associated with at least two histograms; and
   the Bayesian error is determined based on at least values in corresponding intervals of the at least two feature histograms.

4. The method of claim 1, wherein:
   the lookup table comprises a plurality of entries; and
   the plurality of entries correspond to the histogram intervals of the feature histogram having unequal width.

5. The method of claim 4, wherein the width of at least one of the histogram intervals is based on at least a distance between the feature histograms.

6. The method of claim 4, wherein the width of at least one of the histogram intervals is based on at least a maximum of a set that includes minimums of histogram intervals of the feature histograms.

7. The method of claim 1, wherein:
   the feature histogram initially has histogram intervals of equal width; and
   at least one set of adjacent consistent histogram intervals is merged.

8. The method of claim 7, wherein a set of histogram intervals is consistent if a difference between the feature histograms over the set of histogram intervals does not change sign.

9. The method of claim 7, wherein the histogram intervals of the feature histogram are iteratively so merged until no adjacent histogram intervals are consistent.

10. The method of claim 7, wherein at least one further set of adjacent histogram intervals is merged, the at least one further set including a histogram interval over which a minimum distance between the feature histograms occurs.

11. The method of claim 10, wherein:
    a number of histogram intervals of the feature histogram is greater than a target; and
    the histogram intervals of the feature histogram are iteratively further merged until the number of histogram intervals is equal to the target.

12. The method of claim 7, wherein a target number of histogram intervals for the feature histogram is at least an order of magnitude less than the initial number of histogram intervals.

13. The method of claim 7, wherein a histogram interval is split so as to maximize information gain in resulting histogram intervals.

14. The method of claim 13, wherein:
    a number of histogram intervals of the feature histogram is less than a target; and
    the histogram intervals of the feature histogram are iteratively so split until the number of histogram intervals is equal to the target.

15. A method for object detection, the method comprising:
    a processor executing the acts of:
    generating a feature space histogram for each feature extractor and object class by applying the feature extractor to training data labeled with the object class;
    determining a number of the feature space intervals of the feature histogram;
    instantiating a lookup table for a plurality of weak classifiers;
    setting entries in the lookup table corresponding to the feature space intervals;
    selecting a weak classifier from the plurality of weak classifiers based on, at least, Bayesian errors associated with the plurality of weak classifiers;
    determining a strong classifier based on at least the selected weak classifiers; and
    modifying a computer-readable medium based on at least the strong classifier.

16. The method of claim 15, wherein selecting from the plurality of weak classifiers comprises selecting a weak classifier with a minimum associated Bayesian error.

17. The method of claim 15, wherein:
    the plurality of weak classifiers comprises a plurality of sets of weak classifiers; and
    selecting from the plurality of weak classifiers comprises selecting a weak classifier from a set of the plurality of sets having a minimum associated Bayesian error in the set.

18. A system comprising:
    a memory;
    a processor coupled to the memory;
    a Bayesian stump generator stored in the memory and executable on the processor, configured to instantiate at least one Bayesian stump, the at least one Bayesian stump constructed for each feature and object class;
    an object detection and/or recognition (ODR) function generator stored in the memory and executable on the processor, configured to instantiate an object detection function based on at least one Bayesian stump, the object detection function constructed for a particular object class;

the ODR function generator stored in the memory and executable on the processor, configured to detect an object with the object detection function; and a Bayesian Boosting ODR module stored in the memory and executable on the processor, configured to modify a computer-readable medium responsive to the detection.

19. The system of claim 18, wherein the object detection function is optimal with respect to Bayesian error.

20. The system of claim 18, wherein the instantiating the object detection function comprises determining a set of Bayesian stumps each with a minimum associated Bayesian error.

* * * * *